(12) United States Patent
Bandari et al.

(10) Patent No.: US 12,052,321 B2
(45) Date of Patent: *Jul. 30, 2024

(54) DETERMINING SESSION INTENT

(71) Applicant: Pinterest, Inc., San Francisco, CA (US)

(72) Inventors: Dorna Bandari, San Mateo, CA (US); Daniel Isaac Lurie, San Francisco, CA (US); Jurij Leskovec, Stanford, CA (US); Shuo Xiang, Burlingame, CA (US); Tien Tran Tu Quynh Nguyen, Redwood City, CA (US)

(73) Assignee: Pinterest, Inc., San Francisco, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/391,721

(22) Filed: Aug. 2, 2021

(65) Prior Publication Data

US 2021/0360077 A1 Nov. 18, 2021

Related U.S. Application Data

(63) Continuation of application No. 16/807,926, filed on Mar. 3, 2020, now Pat. No. 11,082,509, which is a continuation of application No. 15/897,108, filed on Feb. 14, 2018, now Pat. No. 10,587,709.

(60) Provisional application No. 62/460,684, filed on Feb. 17, 2017.

(51) Int. Cl.
*H04L 67/50* (2022.01)
*G06F 16/31* (2019.01)
*H04L 67/306* (2022.01)

(52) U.S. Cl.
CPC .......... *H04L 67/535* (2022.05); *G06F 16/313* (2019.01); *H04L 67/306* (2013.01)

(58) Field of Classification Search
CPC ... H04L 67/535; H04L 67/306; G06F 16/313; G06N 20/20
See application file for complete search history.

(56) References Cited

U.S. PATENT DOCUMENTS

| | | | |
|---|---|---|---|
| 6,269,368 B1 * | 7/2001 | Diamond | G06F 16/3338 |
| | | | 707/999.005 |
| 8,413,250 B1 | 4/2013 | Krynski | |
| 10,587,709 B1 * | 3/2020 | Bandari | G06N 20/20 |

(Continued)

OTHER PUBLICATIONS

A. Katal, M. Wazid, and R. H. Goudar. Big data: Issues, challenges, tools and good practices. In 2013 Sixth International Conference on Contemporary Computing (IC3), pp. 404-409, Aug. 2013.

(Continued)

*Primary Examiner* — Soe Hlaing
(74) *Attorney, Agent, or Firm* — Athorus, PLLC

(57) ABSTRACT

Described are systems and methods for determining session intent of a user. Different users can use a network-based application in many different ways based on, for example, the user's purpose for using the application, the device on which the user is executing the application, the user themselves, date, time, location, etc. Through the collection of user activities during a user session, the intent of a user session can be determined. Once determined, content provided through the application can be further personalized to correspond to the determined session intent.

19 Claims, 14 Drawing Sheets

(56) References Cited

U.S. PATENT DOCUMENTS

| | | | |
|---|---|---|---|
| 2007/0136457 A1* | 6/2007 | Dai | G06Q 30/02 |
| | | | 709/224 |
| 2011/0035397 A1 | 2/2011 | Joshi et al. | |
| 2011/0161492 A1 | 6/2011 | Granville | |
| 2013/0132433 A1 | 5/2013 | Ozertem et al. | |
| 2014/0244610 A1 | 8/2014 | Raman et al. | |
| 2015/0168150 A1 | 6/2015 | Kahn et al. | |
| 2016/0099848 A1* | 4/2016 | Krynski | H04L 12/6418 |
| | | | 709/224 |
| 2016/0225021 A1* | 8/2016 | Cochrane | G06Q 30/0255 |
| 2017/0139954 A1* | 5/2017 | Mei | G06F 16/532 |
| 2018/0191837 A1* | 7/2018 | Christophe | H04L 67/535 |

OTHER PUBLICATIONS

Alex Guazzelli, Michael Zeller, Wen-Ching Lin, Graham Williams, et al. Pmml: An open standard for sharing models. The R Journal, 2009.

Andy Liaw and Matthew Wiener. Classification and regression by randomforest. R News, 2(3):18-22, 2002.

Bamshad Mobasher, Honghua Dai, Tao Luo, and Miki Nakagawa. Effective personalization based on association rule discovery from web usage data. In Proceedings of the 3rd International Workshop on Web Information and Data Management, WIDM '01, pp. 9-15, New York, NY, USA, 2001. ACM.

Bamshad Mobasher, Robert Cooley, and Jaideep Srivastava. Automatic person-alization based on web usage mining. Commun. ACM, 43(8):142-151, Aug. 2000.

Ben Silbermann. 150 million people finding ideas on pinterest. Pinterest Blog, 2016.

C. Shahabi, A. M. Zarkesh, J. Adibi, and V. Shah. Knowledge discovery from users web-page navigation. In Proceedings of the 7th International Workshop on Research Issues in Data Engineering (RIDE '97) High Performance Database Management for Large-Scale Applications, RIDE '97, pp. 20-, Washington, DC, USA, 1997. IEEE Computer Society.

Caroline Lo, Dan Frankowski, and Jure Leskovec. Understanding behaviors that lead to purchasing: A case study of pinterest. In Proceedings of the 22Nd ACM SIGKDD International Conference on Knowledge Discovery and Data Mining, KDD '16, pp. 531-540, New York, NY, USA, 2016. ACM.

Christian Hennig. Cluster-wise assessment of cluster stability. Computational Statistics and Data Analysis, pp. 258-271, 2007.

Gang Kou and Chunwei Lou. Multiple factor hierarchical clustering algorithm for large scale web page and search engine clickstream data. Annals of Operations Research, vol. 197, Issue 1, pp. 123-134, 2012.

Gerard Salton and Michael J. McGill. Introduction to Modern Information Retrieval. McGraw-Hill, Inc., New York, NY, USA, 1983.

Guandong Xu, Yanchun Zhang, and Xiaofang Zhou. Using probabilistic latent semantic analysis for web page grouping. In 15th International Workshop on Research Issues in Data Engineering: Stream Data Mining and Applications (RIDE-SDMA'05), pp. 29-36, Apr. 2005.

Jaideep Srivastava, Robert Cooley, Mukund Deshpande, and Pang-Ning Tan. Web usage mining: Discovery and applications of usage patterns from web data. Acm Sigkdd Explorations Newsletter, 1(2):12-23, 2000.

Jeffrey Heer, Ed H. Chi, and H. Chi. Mining the structure of user activity using cluster stability. In in Proceedings of the Workshop on Web Analytics, SIAM Conference on Data Mining, Arlington VA. ACM Press, 2002.

Jiawei Han, Yandong Cai, and Nick Cercone. Knowledge discovery in databases: An attribute-oriented approach. In Proceedings of the 18th International Conference on Very Large Data Bases, VLDB '92, pp. 547-559, San Francisco, CA, USA, 1992. Morgan Kaufmann Publishers Inc.

Jinze Liu, S. Paulsen, Wei Wang, A. Nobel, and J. Prins. Mining approximate frequent itemsets from noisy data. In Fifth IEEE International Conference on Data Mining (ICDM'05), pp. 4, Nov. 2005.

Justin Cheng, Caroline Lo, and Jure Leskovec. Predicting Intent Using Activity Logs: How Goal Specificity and Temporal Range Affect User Behavior. In Proceedings of the 26th International Conference on World Wide Web. International World Wide Web Conferences Steering Committee, 2017.

Leonard Kaufman and Peter Rousseeuw. Clustering by means of medoids. North-Holland, 1987.

Magdalini Eirinaki and Michalis Vazirgiannis. Web mining for web personalization. ACM Trans. Internet Technol., 3(1):1-27, Feb. 2003.

Michael J. Shaw, Chandrasekar Subramaniam, Gek Woo Tan, and Michael E. Welge. Knowledge management and data mining for marketing. Decis. Support Syst., 31(1):127-137, May 2001.

Myra Spiliopoulou, Bamshad Mobasher, Bettina Berendt, and Miki Nakagawa. A framework for the evaluation of session reconstruction heuristics in web-usage analysis. INFORMS J. on Computing, 15(2):171-190, Apr. 2003.

Peter Rousseeuw. Silhouettes: A graphical aid to the interpretation and validation of cluster analysis. J. Comput. Appl. Math., 20(1):53-65, Nov. 1987.

R. Cooley, B. Mobasher, and J. Srivastava. Web mining: information and pattern discovery on the world wide web. In Proceedings Ninth IEEE International Conference on Tools with Artificial Intelligence, pp. 558-567, Nov. 1997.

Rakesh Agrawal and Ramakrishnan Srikant. Mining sequential patterns. In Proceedings of the Eleventh International Conference on Data Engineering, ICDE '95, pp. 3-14, Washington, DC, USA, 1995. IEEE Computer Society.

Rakesh Agrawal, Tomasz Imielinski, and Arun Swami. Mining association rules between sets of items in large databases. SIGMOD Rec., 22(2):207-216, Jun. 1993.

S. Tiwari, D. Razdan, p. Richariya, and S. Tomar. A web usage mining frame-work for business intelligence. In 2011 IEEE 3rd International Conference on Communication Software and Networks, pp. 731-734, May 2011.

Tak Woon Yan, Matthew Jacobsen, Hector Garcia-Molina, and Umeshwar Dayal. From user access patterns to dynamic hypertext linking. In Proceedings of the Fifth International World Wide Web Conference on Computer Networks and ISDN Systems, pp. 1007-1014, Amsterdam, the Netherlands, the Netherlands, 1996. Elsevier Science Publishers B.V.

Tilman Lange, Volker Roth, Mikio L. Braun, and Joachim M. Buhmann. Stability-based validation of clustering solutions. Neural Computation, 16(6): 1299-1323, Jan. 29, 2017 2004.

Xin Jin, Yanzan Zhou, and Bamshad Mobasher. Web usage mining based on probabilistic latent semantic analysis. In Proceedings of the Tenth ACM SIGKDD International Conference on Knowledge Discovery and Data Mining, KDD '04, pp. 197-205, New York, NY, USA, 2004. ACM.

Yongjian Fu, Kanwalpreet Sandhu, and Ming-Yi Shih. A generalization-based approach to clustering of web usage sessions. In Revised Papers from the International Workshop on Web Usage Analysis and User Profiling, WEBKDD '99, pp. 21-38, London, UK, UK, 2000. Springer-Verlag.

Yoon Ho Cho, Jae Kyeong Kim, and Soung Hie Kim. A personalized recommender system based on web usage mining and decision tree induction. Expert Systems with Applications, 23(3):329-342, 2002.

* cited by examiner

DETERMINING SESSION INTENT

PRIORITY CLAIM

This application claims the benefit of U.S. Provisional Patent Application No. 62/460,684, which was filed on Feb. 17, 2017, U.S. patent application Ser. No. 15/897,108, which was filed on Feb. 14, 2018, and U.S. patent application Ser. No. 16/807,926, which was filed on Mar. 3, 2020. These applications are hereby incorporated by reference herein in their entireties.

BACKGROUND

With the ever-expanding amount of accessible digital content available to users and customers, it continues to become more and more difficult to discover the content for which the user is searching. Several different search techniques exist, such as keyword searching, but there are many inefficiencies in such systems. Likewise, with an ever-increasing number of users, social networks, and the variety of types of devices utilized by users, it is becoming more and more difficult for companies to determine what content should be provided to users.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Described are systems and methods for determining session intent of a user during a user session. Different users can use a network-based application in many different ways based on, for example, the user's purpose for using the application, the device on which the user is executing the application, the user themselves, location, time, date, etc. Through the collection of user activities during a session, the intent of a user session can be determined. Once determined, content provided through the application can be further personalized to correspond to the intent of the user.

In accordance with the described implementations, session logs that include user actions are generated and utilized to determine in-session user behavior or user intent for the user session. For example, a classification system may be trained based on a plurality of stored event logs. Once trained, the classification system may be used to classify existing user sessions into one of multiple session categories based on information about the user, device, and initial user actions performed in the user session.

As discussed further below, in some implementations, user actions within a user session are determined to be either scoring actions (also referred to herein as scoring features) or longtail actions (also referred to herein as longtail features). In some implementations, the longtail features may be replaced and represented collectively as new feature, referred to herein as a noise feature, that is less sensitive to product experimentation and logging changes that may be done by a provider or system that delivers content to the user via the application. This allows for robust and stable classification of session types regardless of whether the underlying content, system, or provider is changing.

Figure 1:
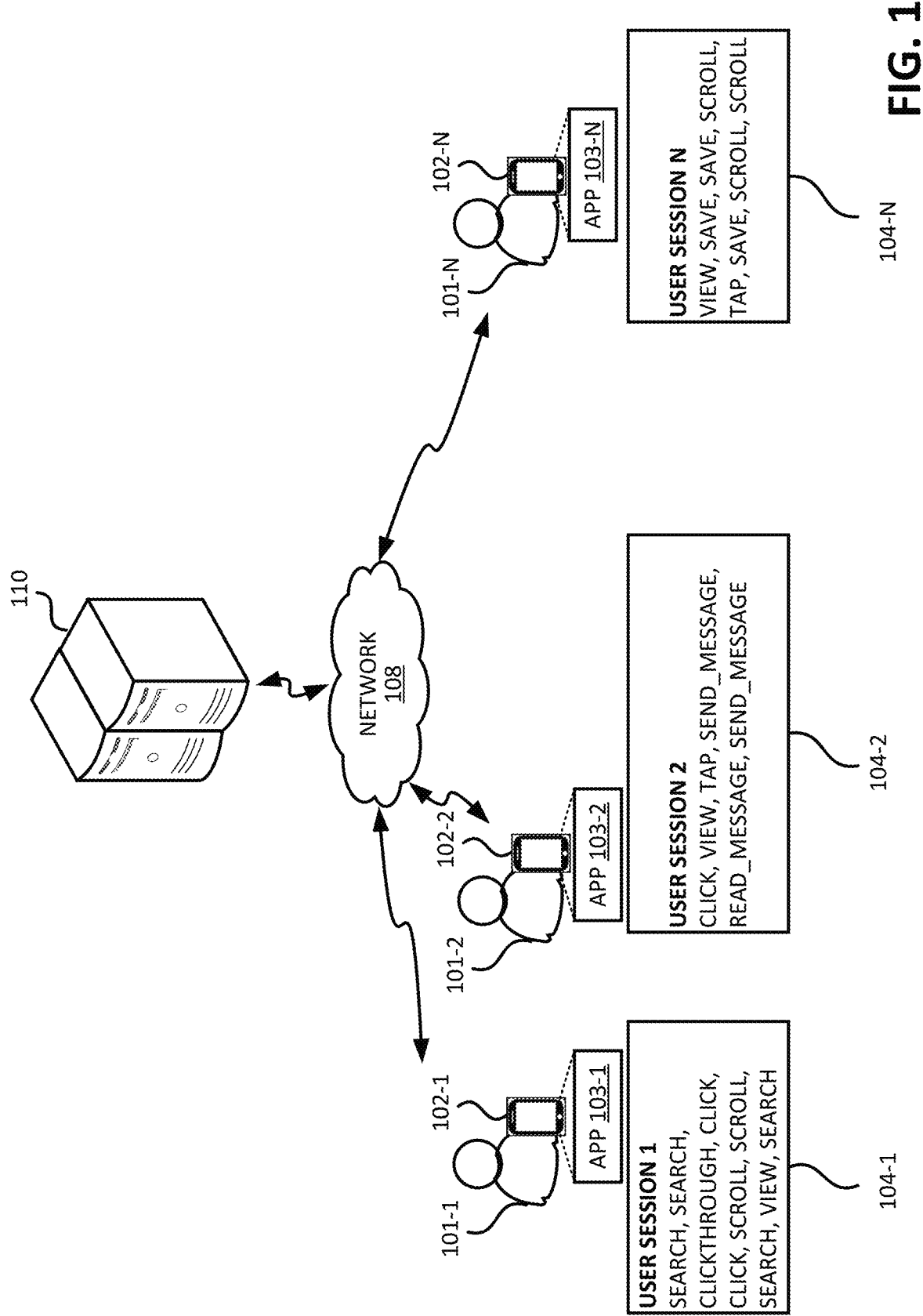
FIG. 1 illustrates a user interaction with a content system over a period of time, generating multiple user session, in accordance with described implementations.

FIG. 1 illustrates a user 101 interacting with a content system 110 over a period of time, generating multiple user sessions, in accordance with described implementations. As user 101 interacts with an application, such as an application 103 executing on a user device 102 (e.g., smart phone, tablet, wearable, laptop computer), a constant stream of user actions (also referred to herein as user events) are recorded in an event log 104 as representative of those actions. In the illustrated example, a first user 101 interacts with a content system 110 via a network 108 through an application 103 executing on a user device 102. As discussed further below, the user device may be any type of user device, such as a smart phone, tablet, laptop computer, wearable, etc.

In this example, the user 101 generates multiple user sessions during a period of time, such as a one day. Each user session, in this example, is determined based at least in part on a time-lapse between user actions. For example, a user session may be determined as a group of user actions that occur in an isolated period of time, with at least a pre-defined gap of inactivity before and after. The gap may be determined based on a distribution of inter-action times on each device. In other implementations, the pre-defined gap, may be a set time of inactivity (e.g., five minutes, ten minutes).

During each user session, user actions are recorded in an event log. For example, during a first user session, the user 101-1 interacts with an application 103-1 executing on a user device 102-1 and performs a series of user actions that are recorded in an event log 104-1. In this example, the series of user actions during the first user session include: search, search, clickthrough, click, click, scroll, scroll, search, view, search. During a second user session, the user 101-2 interacts with the application 103-2 executing on a user device 102-2 and performs a series of user actions that are recorded in an event log 104-2. In this example, the series of user actions during the second user session include click, view, tap, send_message, read_message, send_message. The user 101-N may perform any number of user sessions, by interacting with one or more applications 103-N executing on any of a variety of devices 102-N and perform any number, type, and/or combinations of user actions, each of which are recorded in an event log 104-N during the respective user session.

In addition, in some content systems, millions or more users may engage in one or more user sessions over a period of time, thereby potentially resulting in billions, or more, user actions and/or event logs. For example, some users may engage in multiple user sessions with a content system multiple times a day. In other examples, other users may only engage with the content system every few days, or once per day. Likewise, the users may utilize the same or different devices. By collecting user actions for each of the user sessions, the user sessions can be classified into different session types using a clustering algorithm based on the user actions and then utilized to train a classifier. The classifier, once trained, can classify future user sessions based on a few initial user actions, the user information (e.g., user profile) about the user, the device type in use by the user, etc. In other implementations, other factors, including but not limited to, user location, time of day, day of week, week of year, etc., may also be utilized by the classification system to classify the user session.

Upon classification of a user session, content can be selected that is best suited for the user based on the determined user session classification. For example, a first advertisement type of advertisement may be best suited for presentation to a user when the user is performing a session of a first user session type and a second type of advertisement may be best suited for presentation to the user when the user is performing a session of a second user session type.

Figure 2:
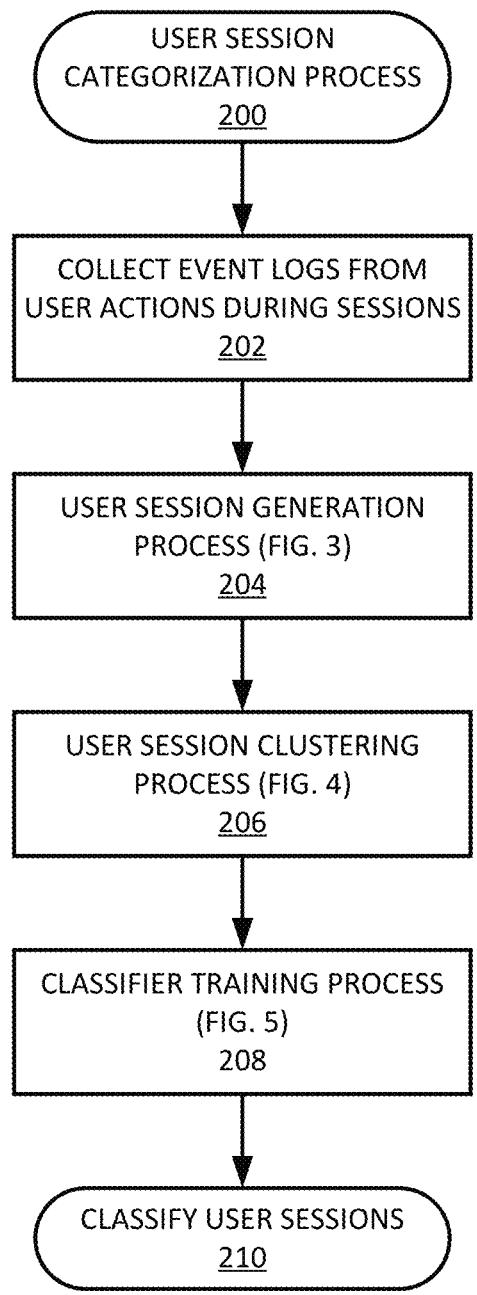
FIG. 2 illustrates an example user session categorization process, in accordance with described implementations.

FIG. 2 illustrates an example user session categorization process 200, in accordance with described implementations. The example process 200 begins by collecting a plurality of event logs, each event log representative of user actions during a respective user session, as in 202. The event logs may be collected over any defined period of time (e.g., one day, one week, etc.). Likewise, an event log may correspond to user actions of a single user, user actions of multiple users, user actions by device type, user actions by date, etc., or any combination thereof. Utilizing the event logs, a user session generation process is performed, as in 204. Generally described, the user session generation process processes the raw data of the event logs to assign each user action to the user that performed the action, remove irrelevant data, and filter out background actions included in the event logs (e.g., actions/events that are not triggered explicitly by user action). The user session generation process is discussed in more detail below with respect to FIG. 3.

Upon generation of the user sessions, the user sessions are clustered according to a user session clustering process, as in 206. Generally, the user session clustering process clusters user sessions based on the user actions included in those user sessions. The user session clustering process is discussed in more detail below with respect to FIG. 4.

Utilizing the clustered user sessions, a classifier system, also referred to herein as a classifier, is trained using a classifier training process, as in 208. The classifier training process utilizes the clusters of user sessions as inputs to train the classifier so that the classifier can determine the session type or classification of additional user sessions. The classifier training process is discussed in further detail below with respect to FIG. 5.

Finally, once the classifier system has been trained, it may receive as inputs user actions during a current user session, information about the user, device type information, etc., and quickly classify the user session, as in 210. As discussed further bellow, user sessions can be classified in real time or near real time and content presented to the user during the user session may be adjusted based on the determined user classification.

Figure 3:
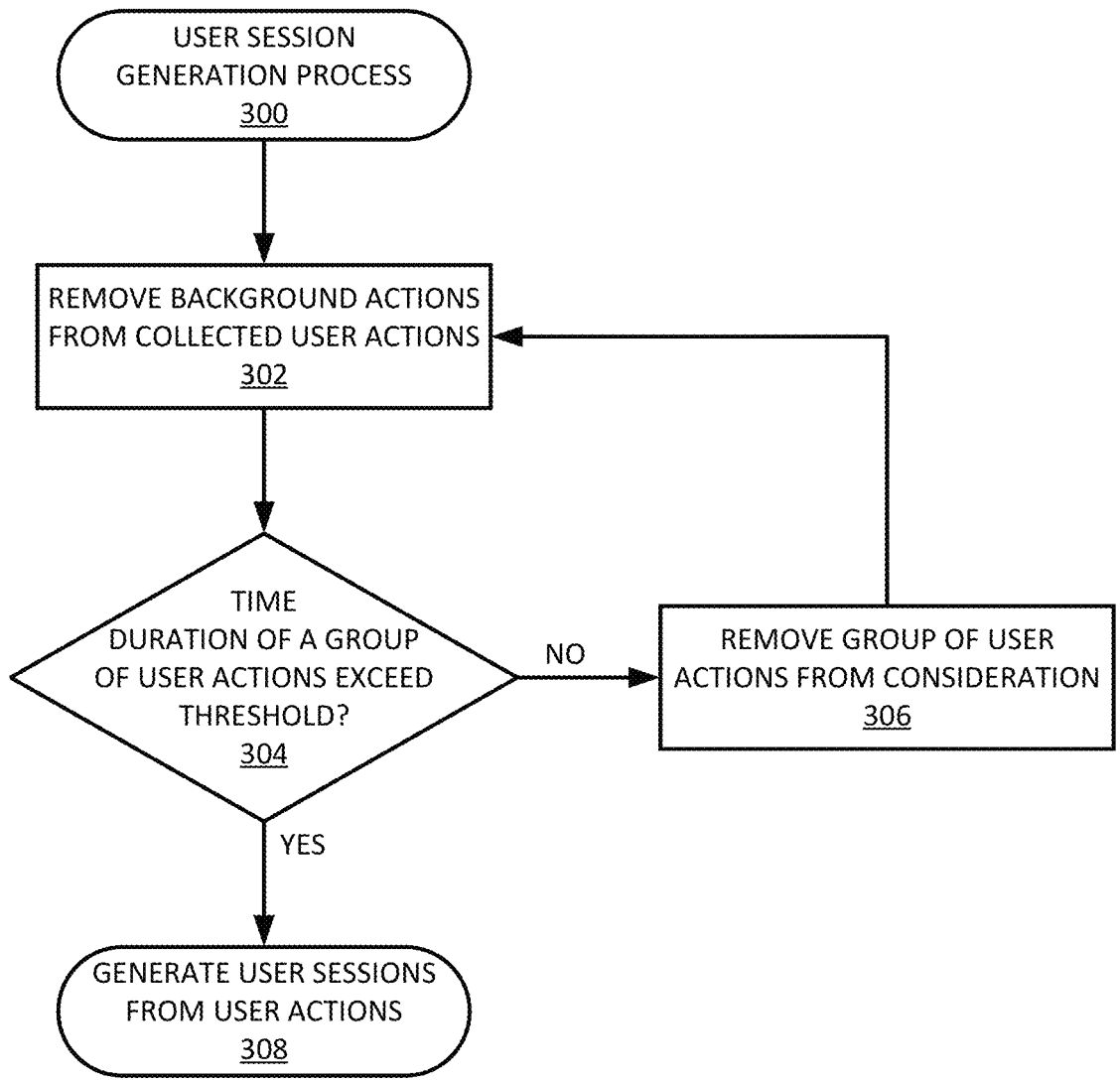
FIG. 3 illustrates an example user session generation process, in accordance with described implementations.

FIG. 3 illustrates an example user session generation process 300, in accordance with described implementations. In some implementations, user actions from all users and all applications that are accessing the content system may be stored collectively in one or more event logs, along with a user identifier or a device identifier and a timestamp indicating when the user action occurred. In addition, background actions that were not performed explicitly by the user (e.g., are performed by an application) may also be stored in the event log(s). In other implementations, event logs may be maintained based on device type, user identifier, or any combination thereof.

Utilizing the event log(s), the example process 300 processes the user actions to remove background actions from the collected user actions, as in 302. Background actions include any action that is not a user performed action. For example, a background action may be an application content request, etc.

Once the background actions have been removed from the event log(s), a determination is made as to whether the time duration of a group of user actions exceeds a threshold time, as in 304. A group of user actions may be a series of user actions that occur during a period of time that is preceded and followed by a period of inactivity from that user or device associated with that user. The periods of inactivity may be any defined period of time and may vary based on, for example, the user, the device type, etc. Likewise, the threshold time may be any defined period of time (e.g., five minutes, ten minutes) and may vary based on, for example, the user, device type, etc. If it is determined that the group of user actions do not exceed the threshold, the group of user actions is removed from consideration, as in 306. However, if it is determined that the group of user actions does exceed the threshold, the group is retained. After all groups of user actions that do not exceed the threshold have been removed from the event log(s), user sessions are generated, as in 308. As discussed above, the user sessions may be specified as a group of user actions that occur during a period of time that is preceded and followed by a period of inactivity.

Figure 4:
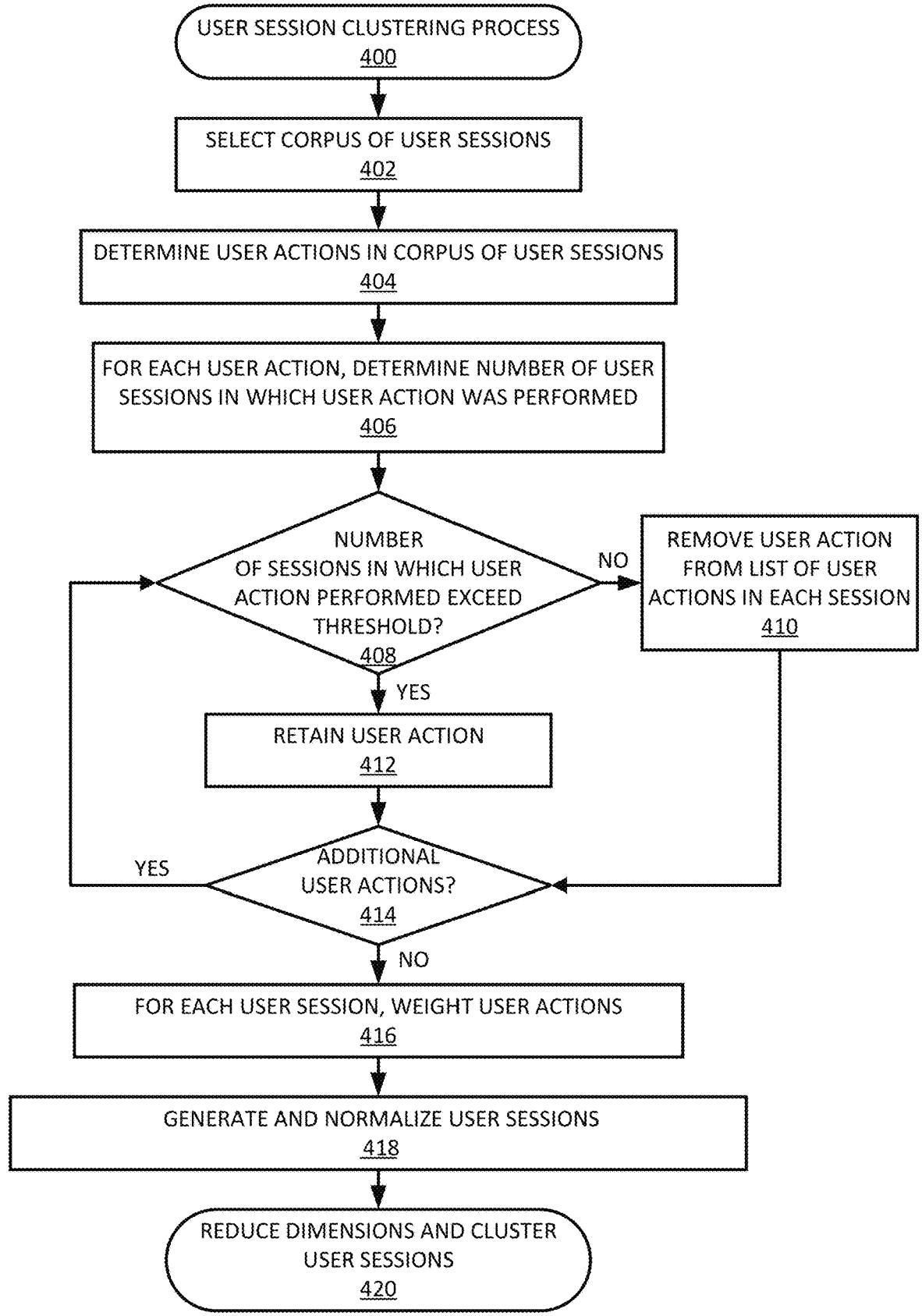
FIG. 4 illustrates an example user session clustering process, in accordance with described implementations.

Once the user sessions have been created from the event logs, a user session clustering process is performed to cluster the user sessions. FIG. 4 illustrates an example user session clustering process 400, in accordance with described implementations. The example process 400 begins by selecting a corpus of user sessions, as in 402. The corpus of user sessions may be any defined group of user sessions. For example, the corpus may include all user sessions during a twenty-four-hour period that were performed on a device of a first device type. In another example, the corpus may be all user sessions during a period of time (e.g., twenty-four hours, two days, weekend), regardless of device type. As will be appreciated, any number and/or variety of factors may be utilized to determine a corpus of user sessions.

For the corpus of user sessions, all user actions are determined, as in 404. In some implementations, user sessions may be considered as a document and each user action as a word in the document. For example, all user actions from all the sessions in the corpus may be considered as words in a document. In other implementations, the user sessions may be maintained in a table, with each user action represented as a word or identifier in a cell of the table. For each user action, a determination is made as to the number of user sessions of the corpus in which that user action is performed, as in 406. A determination is then made for each user action as to whether the number of sessions in which the action was performed exceeds a performance threshold, as in 408. Like the other thresholds, the performance threshold may be any defined amount or quantity and may vary for different groups of user sessions, etc. If it is determined that the user action usage among the user sessions does not exceed the performance threshold, the user action is removed from the list of user actions performed in user sessions included in the corpus, as in 410. If it is determined that the user action is used in a sufficient number of the user sessions, such that the user exceeds the performance threshold, the user action is retained, as in 412. This determination, removal, and retention, may be performed for each user action included in one or more user sessions of the corpus, as in 414.

Once all the user actions have been processed and either retained or removed, for each user session, the user actions of that user session are weighted, as in 416. In an implementation, weighting may be done using Term Frequency—Inverse Document Frequency ("TF-IDF"). In TF-IDF representation, the number of times a user action occurs in a user session is normalized by the inverse document frequency ("IDF"). IDF reduces the weight of more frequent user actions in the user sessions included in the corpus. As a result, common actions, such as CLICK or SCROLL that occur during user sessions will have a lower weighting in the clustering.

Returning to FIG. 4, each user session is normalized based at least in part on the weighting determined for each user session for the corpus, as in 418. For example, each user session may be represented as a feature vector and each feature vector may be normalized. In another example, data representative of each user session may be normalized to unity. By normalizing the user sessions, the weighted and normalized user sessions can be characterized based on the actions that were dominant in that user session, irrespective of session length of the user session.

In addition to normalizing, in some implementations, the dimensions of the data for the user sessions of the corpus may be reduced and clustered, as in 420. For example, dimensions may be reduced using principal component analysis ("PCA") and the projected results clustered using a K-Medoids algorithm. The number of clusters, or principal components, may be selected based on variance explained by the projected features for each of the user sessions. In addition, factors such as usability of clusters by the content system, percentage of sessions that were clusters in a noise cluster (discussed below), Silhouette score of clusters, which measures the gap between clusters, and/or cluster stability, may also be utilized in determining the number of clusters used. For example, the following Table illustrates factors considered in selecting the number of clusters to utilize from a corpus of user sessions from a single device type that occurred during a twenty-four-hour period.

TABLE 1

| | Number of Clusters | | |
|---|---|---|---|
| | 18 | 13 | 8 |
| % in Noise cluster | 9% | 15% | 21% |
| Average Stability, Jaccard Distance | 0.91 | 0.89 | 0.96 |
| Average Silhouette | 0.3 | 0.33 | 0.39 |
| % Clustered with Stability of +0.7 | 96% | 100% | 100% |

In the above example, thirteen clusters wherein chosen because all data is considered stable and the size of the noise cluster is less than the results with other numbers of clusters.

Figure 5:
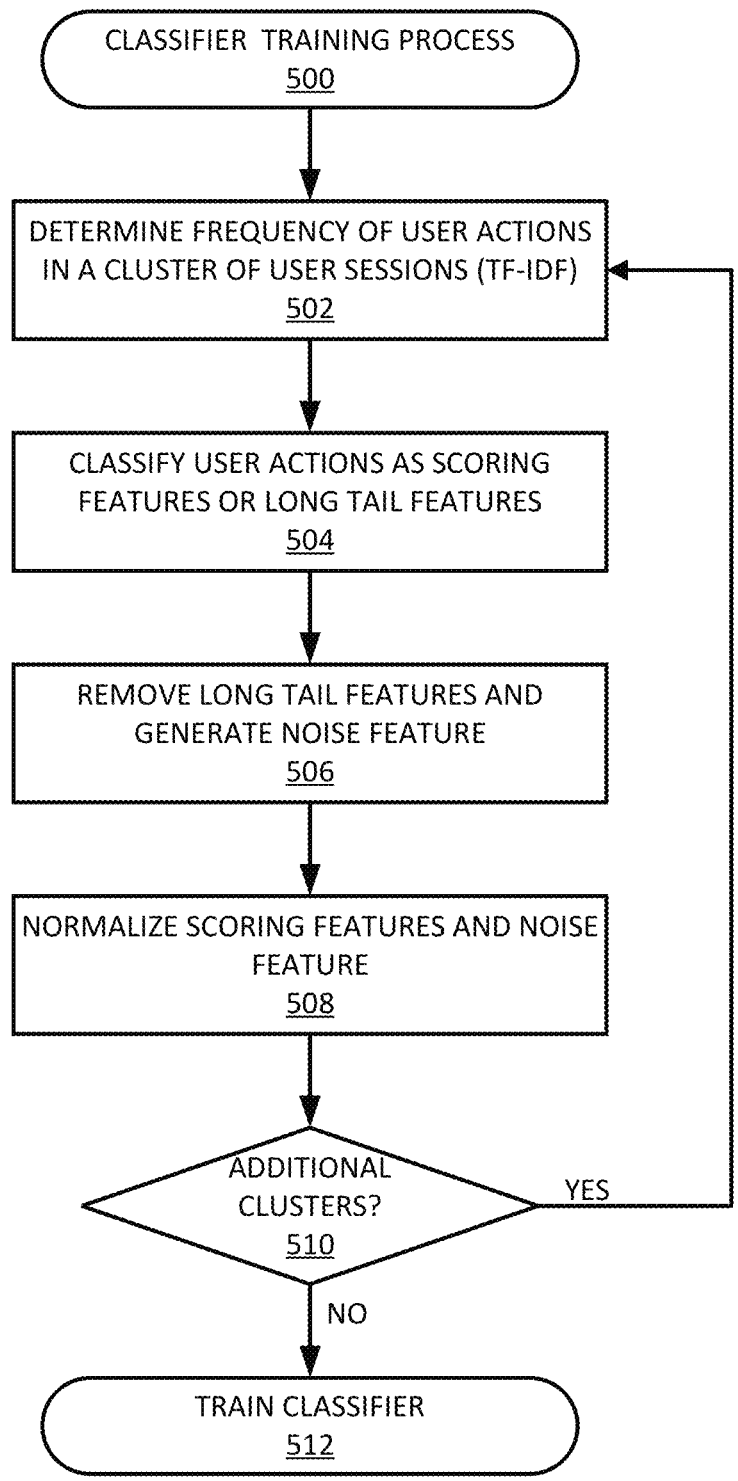
FIG. 5 illustrates an example classifier training process, in accordance with described implementations.

Utilizing the clusters of user groups as inputs, a classifier is trained. FIG. 5 illustrates an example classifier training process 500, in accordance with described implementations. The example process 500 begins by determining a frequency of user actions in a cluster of user sessions, as in 502. In some implementations, the frequency may be determined using TF-IDF so that highly common actions are given less weight.

Each of the user actions are also either classified as scoring features or longtail features, as in 504. As can be appreciated, user actions are not equally robust over time. For example, user actions associated with minute user interactions with user interface elements of an application may vary with minor design changes to the application. For example, changing the size of some display elements on a page of the application may change the frequency of triggering of another user action. These changes may not be the result of fundamental changes in user behavior. The stability issue may be caused by one or more of minor user interface changes that may change the proportion of logged events, and when new features are being experimented with by the content system. Experimentation may lead to artificially high IDF for user events associated with the new feature, as they seem rare.

Because of this variability, scoring features are selected to be robust over time. For example, by analyzing the historical daily counts of events, daily user actions may be deseasonalized and detrended for each event over a period of time and then a variance of errors determined. Events in the decreasing order of variance may then be selected as scoring features. As another example, fundamental events that are selected based on prior knowledge of the system (e.g., clickthrough, search, browse, etc.), may be specified as scoring events. In one implementation, the scoring events are selected to include browse, clickthrough, notification, retrieval, save, and search. In other implementations, fewer, additional, and/or different user actions may be selected as scoring events (also referred to herein as scoring actions or scoring features). Any user action that is not a scoring event, is classified as a longtail event (also referred to herein as longtail action or longtail feature).

Once determined, the longtail features are removed from consideration and a noise feature is generated, as in 506. The longtail features are removed because of their variability and lack of stability. However, because the longtail features are removed from the prediction, information is potentially lost in the longtail user behavior. To avoid losing this information, a noise feature is generated that is defined as:

$$n_i = \frac{\Sigma_{f \in F_s} w_i(f)}{\Sigma_{f \in \{F_s \cup F_{lt}\}} w_i(f)}$$

$F_s$ is the set of scoring features, $F_{lt}$ is the set of longtail features, and $w_i(f)$ is the TF-IDF weight of feature f in session i. Because the longtail events are potentially changing drastically over time, we normalize the $n_i$ feature by the mean of this feature over all user sessions under consideration, as in 508. In addition, the scoring features are also normalized, as in 508. Generation of a noise feature as representative of the longtail features will not result in large shifts in sessions categories if there is a sudden change in longtail user behavior.

A determination is then made as to whether there are additional clusters to process and utilize as inputs into the classifier training process, as in 510. If it is determined that there are additional clusters, the example process 500 returns to block 502 and continues with the next cluster or user session. If it is determined that all clusters have been processed, a classifier is then trained using the normalized TF-IDF weighted scoring features and noise feature of each cluster as inputs, as in 512. In one implementation, the classifier is trained with a random forest model to predict the session categories.

Once trained the classifier may be used to compute scores for each user session and quickly determine the session intent of a user based on user actions during a session, the user information, device type in use by the user during the session, location, time, date, and/or other information.

Figure 6:
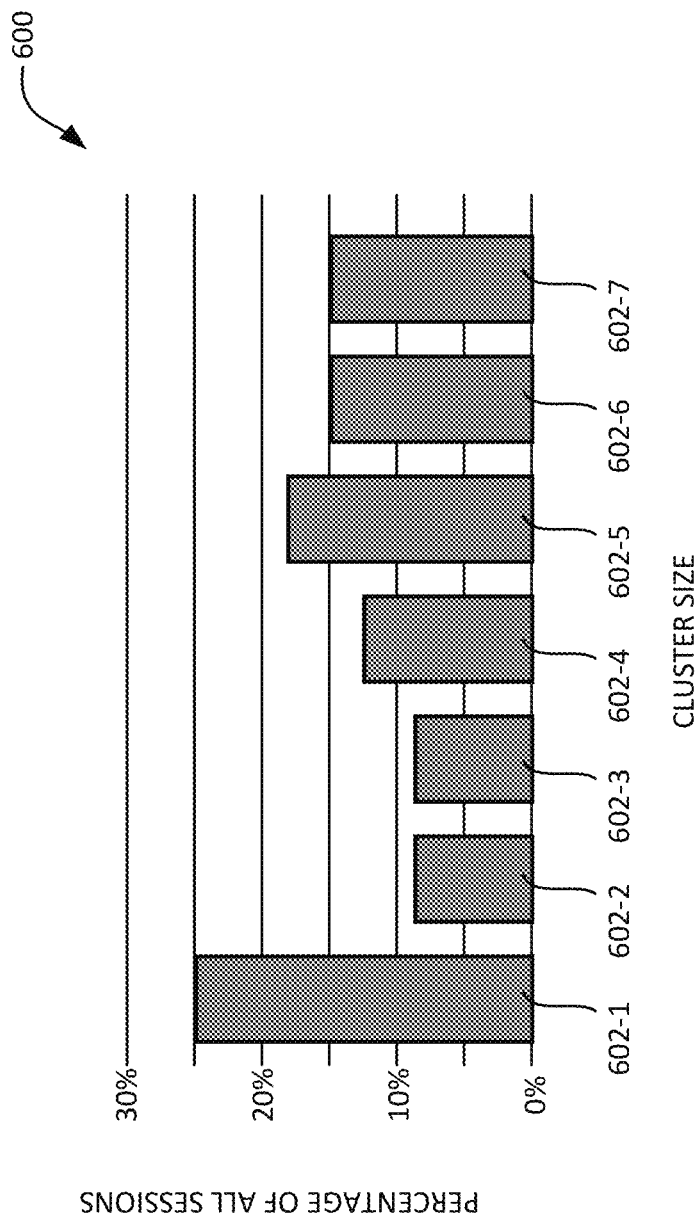
FIG. 6 illustrates a distribution of user sessions across seven categories, or clusters, in accordance with described implementations.

In one implementation, the training input information is clustered (FIG. 4) into seven different session categories, to simplify by qualitative assessment of the clusters, as well as to unify the session categories across the content system applications that are used by different types of devices to access the content system. FIG. 6 illustrates a distribution of user sessions across the seven categories, or clusters, in accordance with described implementations.

Specifically, the chart 600 illustrates that out of the user sessions categorized, twenty-five percent are assigned to a first cluster 602-1, eight percent to a second cluster 602-2, eight percent to a third cluster 602-3, twelve percent to a fourth cluster 602-4, seventeen percent to a fifth cluster 602-5, fifteen percent to a sixth cluster 602-6, and fifteen percent to a seventh cluster 602-7. The following table 2 illustrates a confusion matrix for the clusters for the trained classifier for the seven categories:

TABLE 2

| Category | Browse | Clickthrough | Notification | Noise | Retrieval | Save | Search |
| --- | --- | --- | --- | --- | --- | --- | --- |
| Browse | 93.9% | 0.9% | 0.2% | 2.5% | 0.7% | 1.0% | 0.7% |
| Clickthrough | 0.8% | 94.2% | 0.1% | 2.1% | 1.2% | 0.6% | 1.1% |
| Notification | 0.4% | 0.1% | 97.2% | 1.5% | 0.5% | 0.2% | 0.0% |
| Noise | 8.1% | 2.2% | 1.1% | 73.2% | 9.5% | 3.9% | 2.0% |
| Retrieval | 2.6% | 2.1% | 0.3% | 9.5% | 82.0% | 1.8% | 1.8% |
| Save | 2.1% | 0.4% | 0.2% | 3.4% | 0.9% | 92.0% | 1.1% |
| Search | 0.6% | 0.3% | 0.1% | 0.8% | 0.3% | 0.8% | 9.2% |

Figure 7:
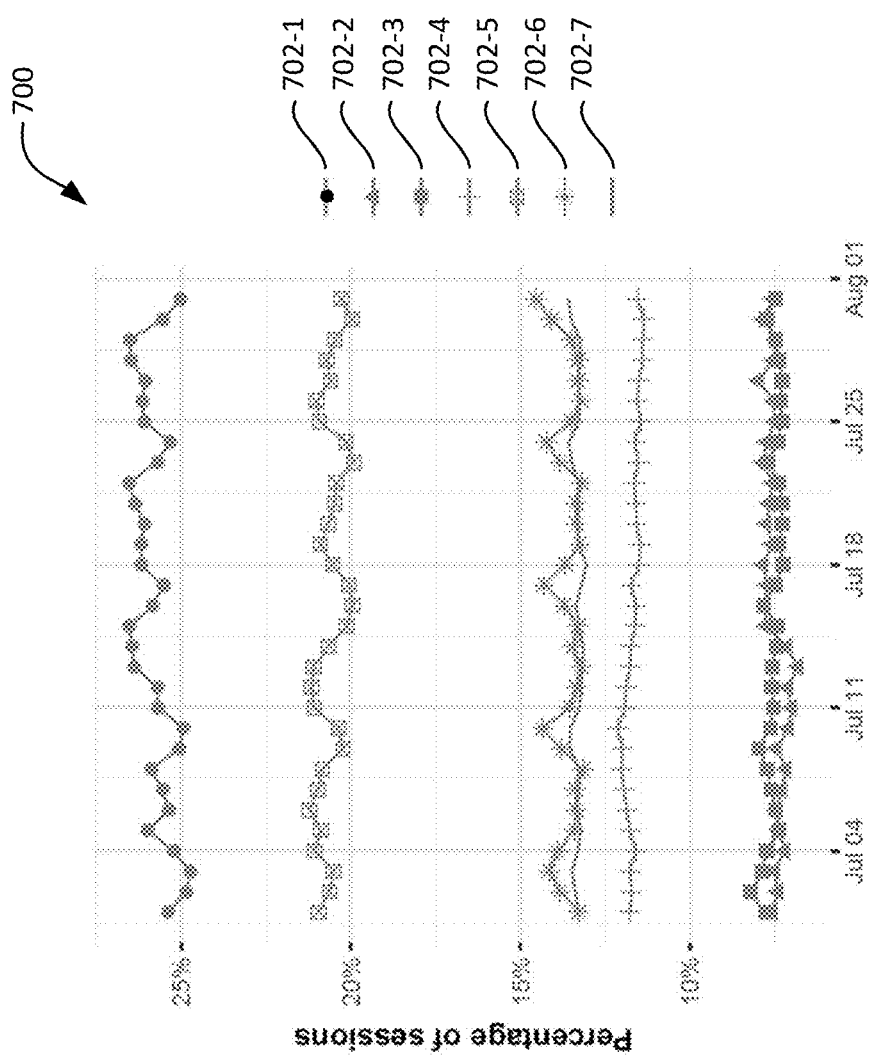
FIG. 7 illustrates a graph showing the stability of session clusters over the three-month period, in accordance with described implementations.

In some implementations, the clusters may be established such that the classification error remains below a defined threshold (e.g., 15%). As illustrated above in Table 2, the classifier or cluster with the largest error is the noise cluster, which is expected, because the features removed are the longtail features that were contributing to user sessions in this cluster. Because the noise cluster may not be utilized in predicting or understanding user sessions, the added error in the noise category is a good trade-off for the added stability of the other clusters. For example, FIG. 7 illustrates a graph 700 showing the stability of session clusters 702-1, 702-2, 702-3, 702-4, 702-5, 702-6, and 702-7 over the three-month period, in accordance with described implementations. As illustrated, each cluster 702 follows a regular weekly seasonal pattern during this period, even though several product experiments were tested by the control system during this same period.

Utilizing the disclosed implementations to establish clusters to quantify the session intent of user sessions, once classified, additional information can be discerned from the classified user sessions. For example, FIG. 8 illustrates a graph 800 of the average revenue generated from each cluster 802, FIG. 9 illustrates a graph 900 of the average user session length for each cluster 902, and FIG. 10 illustrates a transition diagram 1000 indicating the likelihood that a user of a user session 1002 will transition from that classification of user session to a different classification of user session, each in accordance with described implementations.

Figure 8:
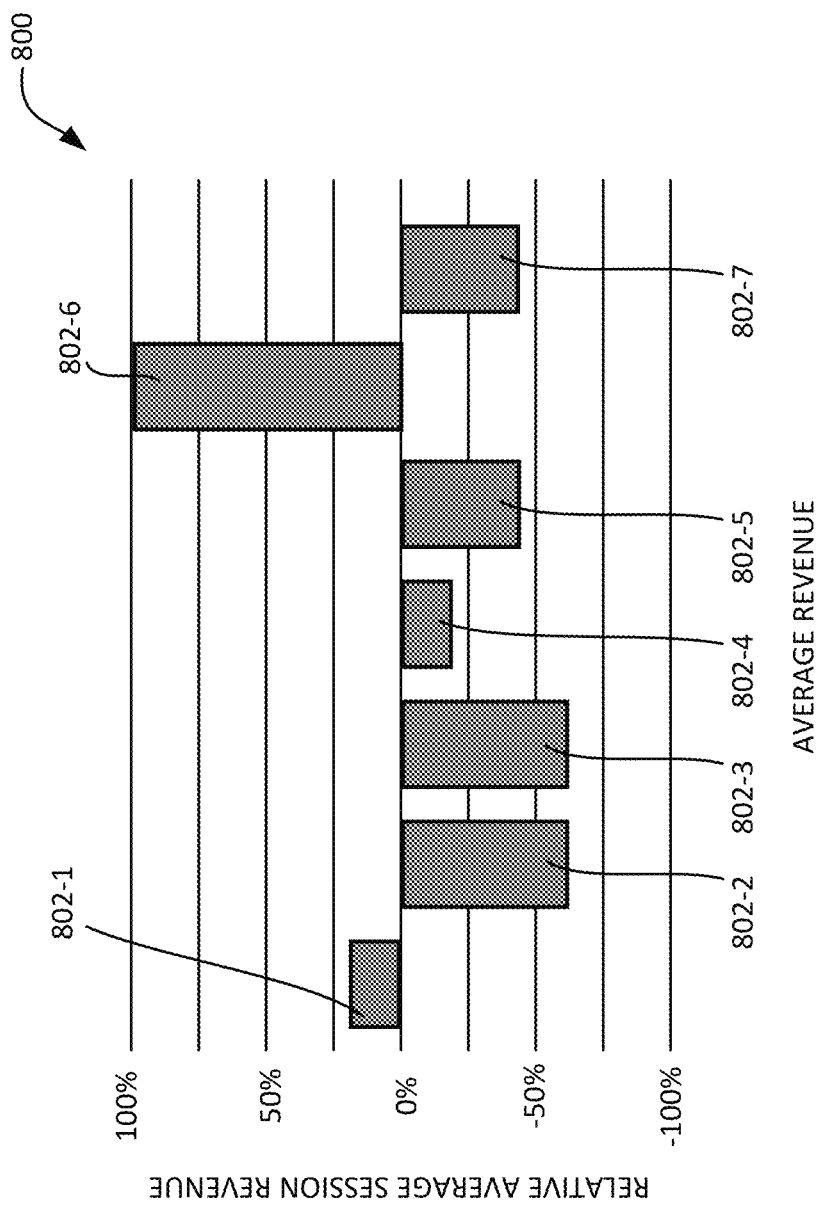
FIG. 8 illustrates a graph of the average revenue generated from session clusters, in accordance with described implementations.

Referring fist to FIG. 8, based on the classified user sessions, it can be determined that the user sessions of clusters 802-1 and 802-6 generate an above average amount of the revenue and that clusters 802-2, 802-3, 802-4, 802-5 and 802-7 generate a below average amount of revenue. As discussed further below, such information may be useful in determining the type of content to present to a user once the user session is determined. For example, if it is determined that a user is conducting a user session that produces an above average amount of revenue (e.g., cluster 802-1, 802-6), it may be recommended that the content system present advertisements to that user to encourage that user to click or select the advertisements as they are known to be in a revenue generating user session.

Figure 9:
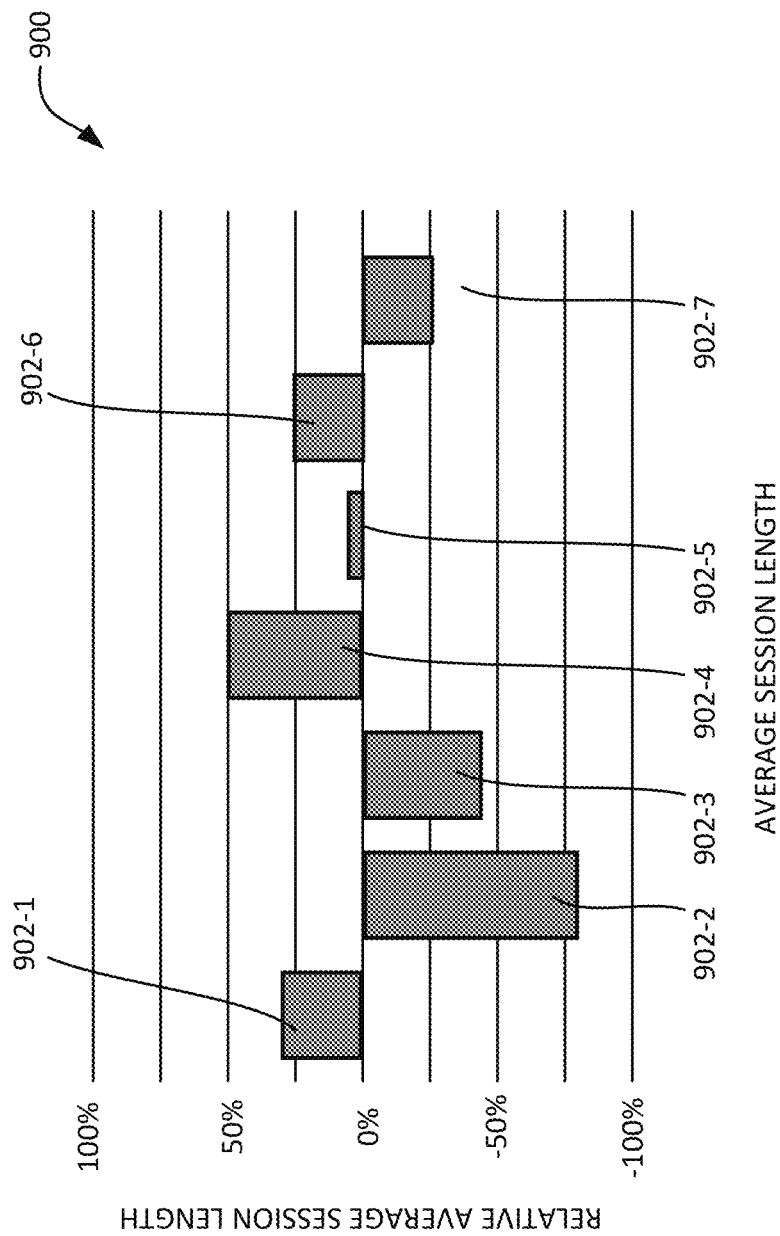
FIG. 9 illustrates a graph of the average user session length from session clusters, in accordance with described implementations.

In a similar manner, FIG. 9 illustrates a graph 900 indicating the average session length of the categories 902-1, 902-2, 902-3, 902-4, 902-5, 902-6, and 902-7. Such information may be useful in determining when and/or how may items of content should be presented to users engaged in each type of user session. For example, if advertisements are to be presented to users during user sessions, if it is determined that a user is performing a user session in category 902-4, the advertisements can be spread over a longer period of time because there is a higher probability that the user will remain in the session longer than, for example, a user performing a user session in category 902-2.

Figure 10:
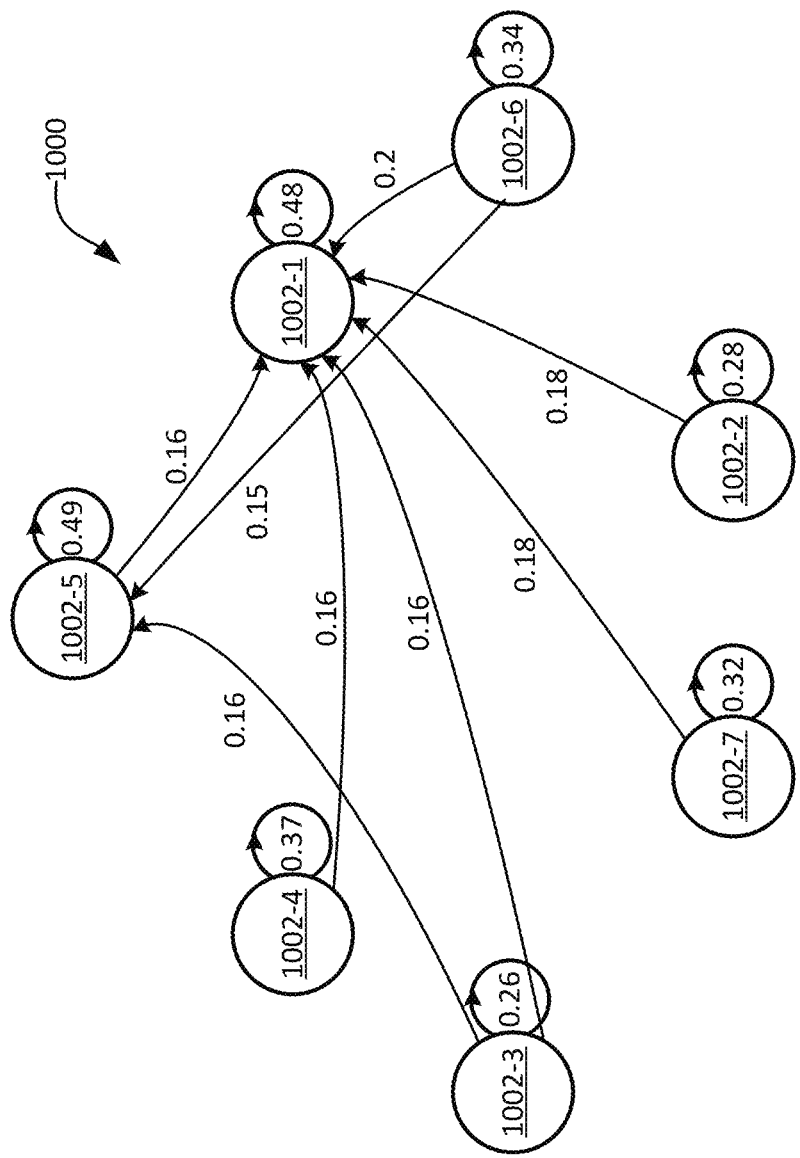
FIG. 10 illustrates a transition diagram indicating the likelihood that a user of a user session will transition from that classification of user session to a different classification of user session, in accordance with described implementations.

Finally, FIG. 10 is a transition diagram 1000 illustrating the likelihood of a user remaining in a user session 1002 or transitioning from that user sessions to a different user session classification, in accordance with disclosed implementations. For simplification, edges with less than 0.15 probability have been removed from the transition diagram 1000.

In this example, once a user session is established, the highest probability for each user session is that the user will remain in that user session type for the duration of the user session. If the user changes sessions, the next highest probability for each session is that the user will transition to category 1002-1. As illustrated, for category 1002-1, there is a 0.48 probability that users will remain in that category of user session. For category 1002-2, there is a 0.28 probability that users will remain in that category of user session and a 0.18 probability that users will transition from category 1002-2 to category 1002-1. For category 1002-3, there is a 0.26 probability that users will remain in that category of user session, a 0.16 probability that users will transition from category 1002-3 to category 1002-1, and a 0.16 probability that users will transition from category 1002-3 to category 1002-5. For category 1002-4, there is a 0.37 probability that users will remain in that category of user session and a 0.16 probability that users will transition from category 1002-4 to category 1002-1. For category 1002-5, there is a 0.49 probability that users will remain in that category of user session and a 0.16 probability that users will transition from category 1002-5 to category 1002-1. For category 1002-6, there is a 0.34 probability that users will remain in that category of user session, a 0.2 probability that users will transition from category 1002-6 to category 1002-1, and a 0.15 probability that users will transition from category 1002-6 to category 1002-5. For category 1002-7, there is a 0.32 probability that users will remain in that category of user session and a 0.18 probability that users will transition from category 1002-7 to category 1002-1.

Information known about each session category, such as the average cluster size (FIG. 6), average revenue (FIG. 8), average session length (FIG. 9), and/or transition probability (FIG. 10), may be utilized, for example, to plan advertisements and/or content delivery campaigns to different users based on the information known about the intent of the user during a particular user session, and the resultant predictable behavior of a user performing a user session of a determined session category.

Figure 11:
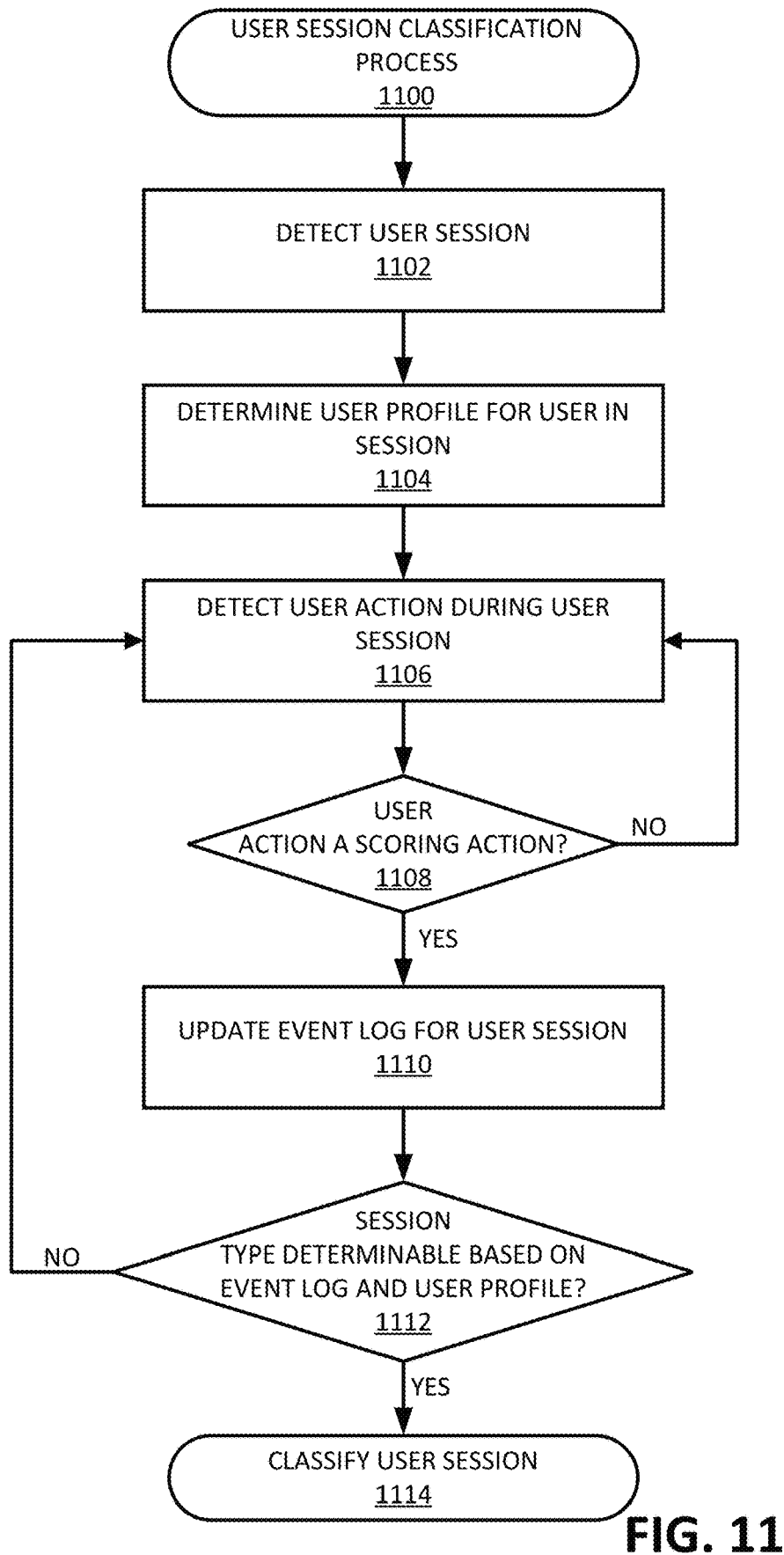
FIG. 11 illustrates an example user session classification process that may be performed in real time or near real time to classify a user session using the trained classifier, in accordance with described implementations.

FIG. 11 illustrates an example user session classification process 1100 that may be performed in real time or near real time to classify a user session using the trained classifier, in accordance with described implementations. The example process 1100 begins by detecting a user session, as in 1102. User session detection may occur, for example, when a user executes an application on a user device and the application sends a request for content to a remote computing resource or the content system. Such a request may also provide user information, such as a user identifier, associated with the device and/or application.

Upon detecting a user session, the user profile of the user executing the session is determined, as in 1104. For example, if the application provides a user identifier, the user identifier may be utilized to obtain or select a user profile associated with that user identifier. A user profile may include information about the user, such as the user name, age, gender, past interaction with the content system, etc.

As the user interacts with the application, one or more user actions during that user session are detected or received by the example process 1100, as in 1106. A determination is then made as to whether a received user action is a scoring action, as discussed above, as in 1108. If it is determined that the user action is not a scoring action (e.g., scroll, profile selection, menu selection) the example process 1100 returns to block 1106 and continues. If it is determined that the user action is a scoring action (e.g., search, clickthrough, browse), an event log is updated for that user session, as in 1110, and a determination is made as to whether a session type for the user session can be determined based on the user actions collected for that user session, as maintained in the event log, as in 1112. In some implementations, other information, such as user the profile, the device type in use by the user, the time or day, user location, etc., may also be utilized in determining whether the user session type can be determined. For example, if the user typically performs a browse type session in the mornings when using a smart phone, and the current user action is during the morning and the user is using a smart phone, based on the received user actions and the user historical information, the example process 1100 may predict that the user session is a browse type user session.

If it is determined that the user session type cannot yet be determined, the example process returns to block 1106 and continues. However, if the user session can be determined, the user session is classified by the classifier into one of the defined session categories, as in 1114. Upon classification, content type and/or other recommendations may be made to suggest content and/or other information (e.g., advertisements) to present to the user during the user session.

Regarding the routines 200, 300, 400, 500, and 1100 described above with respect to FIGS. 2 through 5 and 11, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 13 below. Additionally, in various implementations, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated implementations. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 12:
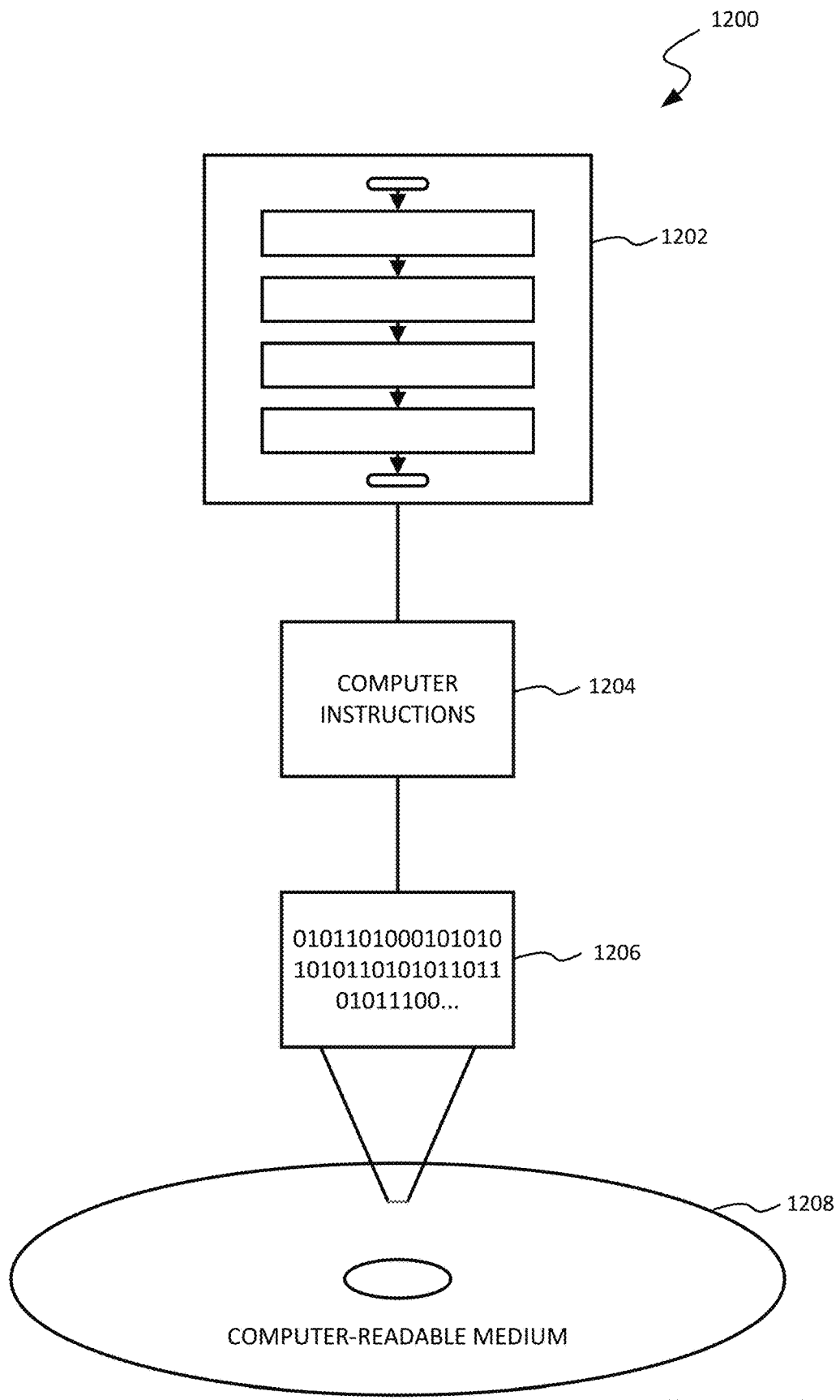
FIG. 12 is a block diagram illustrating an exemplary computer readable medium encoded with instructions, in accordance with described implementations.

Regarding computer readable media, FIG. 12 is a block diagram illustrating an exemplary computer readable medium encoded with instructions, as described in regard to routines 200, 300, 400, 500, and 1100 of FIGS. 2 through 5, and 11, respectively. More particularly, the implementation comprises a computer-readable medium 1208 (e.g., a CD-R, DVD-R or a platter of a hard disk drive), on which is encoded computer-readable data 1206. This computer-readable data 1206 in turn comprises a set of computer instructions 1204 configured to operate according to one or more of the principles set forth herein. In one such implementation 1202, the processor-executable instructions 1204 may be configured to perform a method, such as at least some of exemplary routines 200, 300, 400, 500, and/or 1100, for example. In another such implementation, the processor-executable instructions 1204 may be configured to implement a system on a computing device, such as at least some of the exemplary, executable components of computing device 1300 of FIG. 13, as described below. Many such computer readable media may be devised, by those of ordinary skill in the art, which are configured to operate in accordance with the implementations presented herein.

Figure 13:
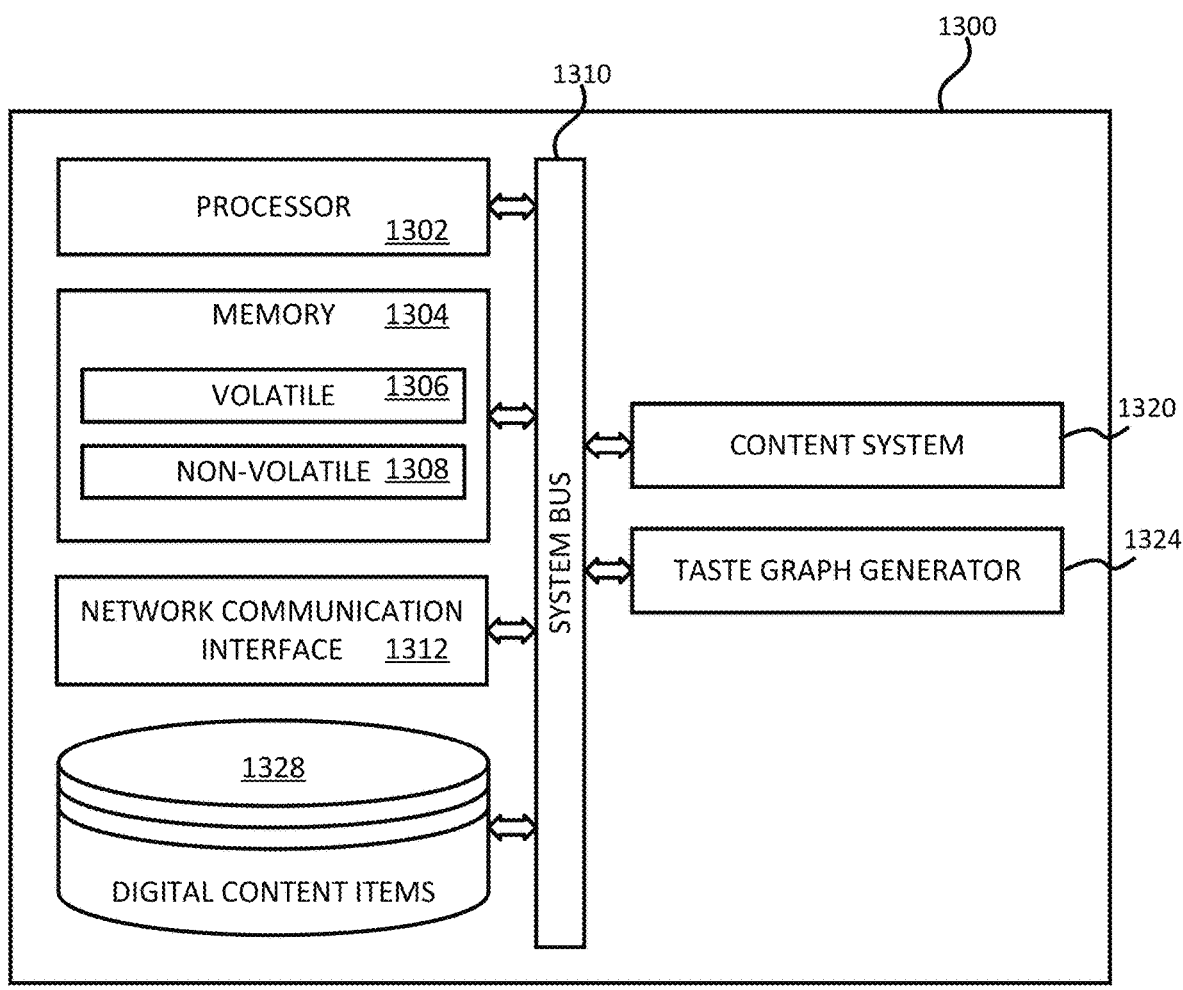
FIG. 13 is a block diagram illustrating an exemplary computing system 1300 (or computing device) suitably configured for implementing the described implementations.

Turning now to FIG. 13, FIG. 13 is a block diagram illustrating an exemplary computing system 1300 (or computing device) suitably configured for implementing the described implementations. The computing system 1300 typically includes one or more processors (or processing units), such as processor 1302, and further includes at least one memory 1304. The processor 1302 and memory 1304, as well as other components of the computing system, are interconnected by way of a system bus 1310.

As will be appreciated by those skilled in the art, the memory 1304 typically (but not always) comprises both volatile memory 1306 and non-volatile memory 1308. Volatile memory 1306 retains or stores information so long as the memory is supplied with power. In contrast, non-volatile memory 1308 is capable of storing (or persisting) information even when a power supply is not available. Generally speaking, RAM and CPU cache memory are examples of volatile memory 1306 whereas ROM, solid-state memory devices, memory storage devices, and/or memory cards are examples of non-volatile memory 1308.

As will be further appreciated by those skilled in the art, the processor 1302 executes instructions retrieved from the memory 1304, from computer readable media, such as computer readable media 1200 of FIG. 12, and/or other executable components in carrying out the various described implementations. The processor 1302 may be comprised of any of a number of available processors such as single-processor, multi-processor, single-core units, and multi-core units, which are well known in the art.

Figure 14:
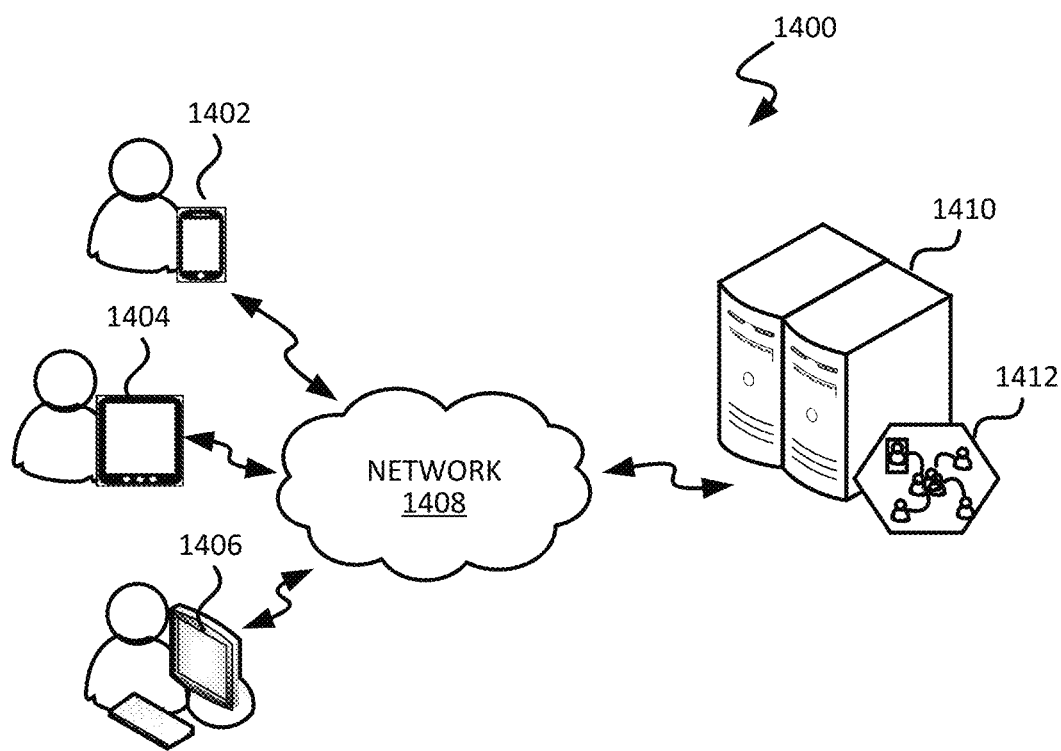
FIG. 14 is a block diagram illustrating an exemplary network environment 1400 suitable for implementing aspects of the described implementations.

Further still, the illustrated computing system 1300 typically also includes a network communication interface 1312 for interconnecting this computing system with other devices, computers and/or services over a computer network, such as network 1408 of FIG. 14. The network communication interface 1312, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 1312, is typically comprised of hardware and/or firmware components (and may also include or comprise executable software components) that transmit and receive digital and/or analog signals over a transmission medium (i.e., the network.)

The exemplary computing system 1300 further includes an executable content system 1320. As described, the content system may be operable to deliver content to devices, receive information from devices, and/or perform one or more of the routines 200, 300, 400, 500, and/or 1100 discussed above. In some implementations, the content system may provide content items from a digital content items store 1328 to a user device as part of a user session. As discussed above, the content system may also determine the session intent (e.g., category), and recommend or select specific content items to present to the user based on the determined category for the user session.

FIG. 14 is a block diagram illustrating an exemplary network environment 1400 suitable for implementing aspects of the described implementations. In particular, the network environment includes one or more users, such as users connected to computing devices, such as computing devices 1402, 1404, and 1406, that are connected to a network 1408. As will be appreciated by those skilled in the art, the user devices may comprise any of a variety of devices such as, by way of illustration and not limitation, tablet computers (such as tablet computer 1404), laptop computers, desktop computers (such as desktop computer 1406), smart phones (such as smart phone 1402), wearables, and the like.

The user computers 1402 through 1406 communicate with other computers and/or devices over one or more networks, such as network 1408. As will be appreciated by those skilled in the art, the network 1408 is a telecommunication network over which computing devices and network enabled processes and/or services may communicate and/or exchange data. By way of illustration, a computer network such as network 1408 may comprise any of a local area network or LAN, a wide area network or WAN, or combinations of the two. According to various implementations of the disclosed subject matter, the network 1408 may comprise the Internet. As those skilled in the art will appreciate, the Internet is a global system of interconnected computer networks that use a defined protocol suite to link devices (including computers) worldwide. Additionally, the Internet is a network of networks that consists of private, public, academic, business, and government networks of varying scope and size, linked by a broad array of electronic, wireless, and/or optical networking technologies. According to aspects of the disclosed subject matter, the user devices, including user devices 1402 through 1406, can communicate with the network 1408 by way of a wired connection, a wireless connection, an optical connection, and/or any other form of communication connection, or combination thereof.

Also included in the exemplary network environment is an online service provider 1412 implemented on a network computing system 1410. As described above, the online service provider 1412, also referred to here as a content system, may operate as a social networking service in which one or more users are able to generate content collections, save content, share content with other users, etc. Moreover, the online service provider 1412 is able to recommend or present digital content that is likely to be of interest to the user, based on a determined session intent of a user session of the user.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   obtaining an event log including a plurality of user actions from a plurality of first user sessions;
   processing the plurality of user actions of the event log to generate a second plurality of user sessions;
   aggregating the user actions included in the second plurality of user sessions to generate an aggregation of user actions;
   for each user action included in the aggregation of user actions, determining a respective frequency indicator representing a number of user sessions in which a respective user action is performed;
   determining a corpus of user sessions from the aggregation of user actions based at least in part on each respective frequency indicator;
   determining a plurality of clusters based on the corpus of user sessions;
   determining an error associated with each of the plurality of clusters;
   identifying a noise cluster from the plurality of clusters based at least in part on the error associated with each of the plurality of clusters;
   removing the noise cluster from the plurality of clusters; and
   training a classifier to determine user sessions by providing the plurality of clusters as training inputs to train the classifier.

2. The computer-implemented method of claim 1, wherein processing the plurality of user actions of the event log to generate the second plurality of user sessions includes at least one of:
   removing background actions from the event log; or
   removing time bound user actions from the event log.

3. The computer-implemented method of claim 1, further comprising:
   comparing a first respective frequency indicator against a threshold value;
   determining that the first respective frequency indicator does not exceed the threshold value; and
   removing the user action associated with the first respective frequency indicator from the aggregation of user actions.

4. The computer-implemented method of claim 1, further comprising:
   prior to determining the plurality of clusters, determining a weight for each user action included in the corpus of user sessions based on a frequency of each respective user action; and
   normalizing the weight for each user action.

5. A computing system, comprising:
   one or more processors; and a memory coupled to the one or more processors and storing program instructions that, when executed by the one or more processors, cause the one or more processors to at least:

obtain a plurality of user sessions, each of the plurality of user sessions including at least one user action;

aggregate the user actions included in the plurality of user sessions to generate an aggregation of user actions;

form a corpus of user sessions from the aggregation of user actions based at least in part on a frequency of each user action, wherein the frequency represents a number of times that each respective user action is included in one or more of the plurality of user sessions;

determine a weight for each user action included in the corpus of user sessions;

based at least in part on the weight for each user action included in the corpus of user sessions, normalize the weight of each user action included in the corpus of user sessions;

based at least in part on the normalized weight of each user action included in the corpus of user sessions, generate a plurality of clusters from the plurality of user sessions included in the corpus of user sessions;

determine an error associated with each of the plurality of clusters;

identify a noise cluster from the plurality of clusters based at least in part on the error associated with each of the plurality of clusters;

remove the noise cluster from the plurality of clusters.

6. The computing system of claim 5, wherein the program instructions that, when executed by the one or more processors, further cause the one or more processors to at least:

provide the plurality of clusters as an input to train a classifier to determine user sessions.

7. The computing system of claim 6, wherein training the classifier includes, at least:

classifying each user action in the plurality of clusters of user sessions as a scoring action or a longtail action;

generating, as a representative of at least a portion of the longtail actions, a noise action;

removing the longtail actions from consideration, and training the classifier based at least in part on the scoring actions and the noise action.

8. The computing system of claim 7, wherein training the classifier further includes, at least:

normalizing the scoring actions; and training the classifier is based at least in part on the normalized scoring actions.

9. The computing system of claim 7, wherein the program instructions that, when executed by the one or more processors, further cause the one or more processors to at least:

subsequent to training the classifier, receive a user action of a user session;

determine, with the classifier and based at least in part on the user action, a session intent for the user session; and in response to determination of the session intent, determine a recommended content item to be sent for presentation as part of the user session.

10. The computing system of claim 7, wherein classifying each user action in the plurality of clusters of user sessions is based at least in part on a determination of a frequency of each user action in a cluster of the plurality of clusters.

11. The computing system of claim 7, wherein the noise action is determined as a function of the scoring actions and the longtail actions.

12. The computing system of claim 5, wherein the weight for each user action is based at least in part on a Term Frequency-Inverse Document Frequency.

13. The computing system of claim 5, wherein the program instructions that, when executed by the one or more processors, further cause the one or more processors to at least:

in response to obtaining the plurality of user sessions, for each user action:

determine a number of user sessions in which the user action was performed;

retain each instance of the user action in the aggregation of user actions if the number of user sessions in which the user action was performed exceeds a threshold; and remove each instance of the user action in the aggregation of user actions if the number of user sessions in which the user action was performed does not exceed the threshold.

14. The computing system of claim 6, wherein the program instructions, that when executed by the one or more processors, further cause the one or more processors to at least:

prior to generation of the plurality of clusters, determine a number of clusters to generate.

15. The computing system of claim 5, wherein the weight of each user session of the plurality of user sessions is normalized to unity.

16. A method, comprising:

obtaining an event log that includes a plurality of user actions from a plurality of user sessions;

generating a corpus of user sessions based at least in part on a frequency of each user action of the plurality of user actions of the event log;

determining a weight for each user action included in the corpus of user sessions;

based at least in part on the weight for each user action included in the corpus of user sessions, normalizing the weight of each user action included in the corpus of user sessions; and clustering, based at least in part on the normalized weight of each user action included in the corpus of user sessions, the corpus of user sessions into a plurality of clusters;

determining an error associated with each of the plurality of clusters;

identifying a noise cluster from the plurality of clusters based at least in part on the error associated with each of the plurality of clusters;

removing the noise cluster from the plurality of clusters;

training a classifier by providing the plurality of clusters as an input to the classifier;

receiving a user action of a user session;

determining, with the classifier and based at least in part on the user action, a session intent for the user session; and in response to determination of the session intent, determining a recommended content item to be sent for presentation as part of the user session.

17. The method of claim 16, wherein normalizing the weight for each user action includes reducing the weight for user actions that are more frequent.

18. The method of claim 16, further comprising:

removing at least one user action from the event log in generating the corpus of user sessions based at least in part on the frequency the at least one user action is included in one or more of the plurality of user sessions.

19. The method of claim 16, wherein training the classifier includes:
classifying each user action of a cluster of the plurality of clusters as either a scoring action or a longtail action;
generating, as representative of at least a portion of the longtail actions, a noise action;
removing the longtail actions from consideration;
normalizing at least the scoring actions; and
training the classifier based at least in part on the normalized scoring actions and the noise action.

\* \* \* \* \*